United States Patent [19]

Arlinghaus

[11] Patent Number: 5,107,197
[45] Date of Patent: Apr. 21, 1992

[54] JUMP START SYSTEM

[76] Inventor: Albert J. Arlinghaus, 2825 Lawrenceburg Ferry Rd., Petersburg, Ky. 41080

[21] Appl. No.: 411,285

[22] Filed: Sep. 22, 1989

Related U.S. Application Data

[63] Continuation-in-part of Ser. No. 275,289, Jan. 4, 1989, abandoned.

[51] Int. Cl.$^5$ ............................................. H02J 7/00
[52] U.S. Cl. ................................... 320/15; 320/7; 320/16
[58] Field of Search .......................... 320/7, 16, 15

[56] References Cited

U.S. PATENT DOCUMENTS

| | | | |
|---|---|---|---|
| 1,924,959 | 8/1933 | Patterson, Jr. | 320/16 X |
| 3,029,301 | 4/1962 | Strider | 320/16 X |
| 4,540,929 | 9/1985 | Binkley | 320/7 X |
| 4,581,570 | 4/1986 | Mejia | 320/16 X |

Primary Examiner—R. J. Hickey
Attorney, Agent, or Firm—Frost & Jacobs

[57] ABSTRACT

A jump starting system for use with the primary battery of a service vehicle is provided having an auxiliary two-volt battery which may be electrically connected in series with the primary battery or electrically connected to a battery charger which is adapted to charge at two volts. The system provides auxiliary power to start the engine of a disabled vehicle.

9 Claims, 1 Drawing Sheet

JUMP START SYSTEM

RELATED APPLICATION

This application is a continuation-in-part of USSN 07/275,289, filed Jan. 4, 1989.

FIELD OF THE INVENTION

This invention relates to jump start systems of the type in which a disabled vehicle may be started by another vehicle equipped with the system.

BACKGROUND OF THE INVENTION

Many times, a vehicle's battery is unable to provide enough cranking power to start the engine. This is often true during particularly inclement weather, or in the case of diesel power vehicles which are not used frequently. Thus, it is often necessary to provide such vehicles with a "jump" or an extra supply of power, by some external source.

Typically, this is done by connecting jumper cables from a fully powered vehicle to the disabled vehicle. For example, the operator of a car with a 12 volt battery would start its engine, and jumper cables would be connected from the terminals of the battery of the running vehicle to the terminals of the battery of the disabled vehicle. The voltage of the electrical system of the running vehicle is typically between 14-16 volts, the voltage above 12 volts being created by the vehicle's alternator. When an attempt is made to start the disabled vehicle, current is drawn from the running vehicle. When the amount of the current draw exceeds the output amperage of the alternator, the voltage will have dropped to that of the running vehicle's battery. The typical alternator can provide only about 60 amps. Current requirements beyond that can only be supplied from the battery. There again, as current is drawn from the battery, the voltage will drop accordingly. It is hoped that the power of the running vehicle is sufficient to start the disabled vehicle. However, if the current draw is too high, then the voltage of the running vehicle will drop to a level too low to spark the plugs. In such a case, no amount of cranking will start the engine. Thus, it may be necessary to supply the charging vehicle with more power than a normal 12 volt battery can supply.

The amperage necessary to start a disabled vehicle increases as the temperature of the engine decreases. In low temperatures, there is more internal friction due to the fit of the components and the viscosity of the oil than when the temperature is warm. This results in a need for higher torque to rotate the crank shaft during starting Additionally, large vehicles with large engines usually require more torque during starting. In certain cases, it may be necessary for extended cranking of the engine during starting because the engine's problem is not in the rotating of the crank shaft, but in other areas, such as a flooded carburetor. Extended cranking can quickly drain the battery of even an operatable vehicle.

To provide the necessary amperage for these conditions, a service vehicle may include a generator powered by a separate engine. To use such a system, the engine is started and the output of the generator is connected to the disabled vehicle. The generator is sized to provide as much as 1,200 cold cranking amps at a voltage in the range of 14 to 16 volts. Such a system is both expensive and noisy to operate, and takes up space in a service vehicle.

A typical prior art jump start system is disclosed in U.S. Pat. 3,105,910 to Chambers. In this patent, a service vehicle is equipped with a 12 volt service vehicle battery, and a 12 volt auxiliary battery. When servicing a disabled battery with a 6 volt battery, the service truck battery is connected in parallel to the dead battery. When servicing a 12 volt battery, the service truck battery and auxiliary battery are connected in series, and then connected to the disabled 12 volt battery in parallel. This arrangement will most certainly provide the dead battery with a sufficient charge to start the vehicle. However, connecting the dead battery to one with twice the voltage output is likely to damage the battery, as well as blowing dash bulbs and any computers on the disabled vehicle. A similar arrangement is disclosed in U.S. Pat. No. 3,343,057 to Smith.

The prior art also discloses systems which are used to provide an extra supply of power to a disabled vehicle. These systems are stored and used only on the disabled vehicle. U.S. Pat. No. 1,924,959 to Patterson shows a storage battery apparatus used in conjunction with a 6 volt vehicle battery. This apparatus was patented when typical automobile engines used a 6 volt battery. In this invention, an extra 2 volt cell is added to the normal 6 volt battery giving it a capability of 8 volts. This new battery would replace the existing 6 volt battery within the automobile. The 2 volt battery was normally connected in parallel to the remaining three 2 volt cells of the battery. If the car would not start under the power supplied by the 6 volt battery, the 2 volt battery could be connected in series to the 6 volt battery providing an 8 volt battery to supply power to the automobile.

U.S. Pat. No. 4,004,208 to Tamminen shows another on board vehicle starting aid. This system utilizes a pair of auxiliary batteries, each being 12 volts. However, these batteries are only able to provide a current on the order of 10 amperes. This system provides only a minimal amount of extra power to the dead battery, and which would be insufficient to start heavy duty or diesel equipment.

The limitations of the prior art listed are obvious. The Smith '057 and Chambers '910 devices both utilize a 24 volt source to start a 12 volt battery powered vehicle. Using this type of system is potentially very dangerous to the dead battery, as well as other parts of the vehicle. The Patterson '959 and Tamminen '208 devices are on board systems and provide only a small additional charge. These units would be ineffective if the battery was completely dead, or if the vehicle being charged had a diesel engine or was a heavy duty vehicle.

SUMMARY OF THE INVENTION

Accordingly, it is a primary object of the present invention to provide an effective and highly reliable jump start system which is capable of starting a vehicle whose battery is disabled, or unable to provide the needed cranking power.

It is another object of the present invention to provide a jump start system which will safely and effectively start a vehicle with either a 12 or 24 volt battery.

It is another object of the invention to provide a jump start system which is self-charging, allowing the operator to jump many vehicles in succession.

It is yet another object of the present invention to provide a jump start system which is smaller than other systems currently on the market.

A still further object of the present invention is to provide a jump start system which may be employed relatively cheaply.

It is yet a further object of the present invention to provide a jump start system which is less noisy than conventional systems, allowing the operator to determine when the engine of the disabled vehicle is operating under its own power.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a jump starting system is provided having at least one auxiliary battery with electrical terminals of a first and second polarity which correspond to the polarities of the terminals of the service vehicle battery. Means are provided for electrically connecting the auxiliary battery in series with the service vehicle such that the total nominal design voltage across both batteries is less than twice the nominal design voltage of the disabled vehicle battery.

In accordance with a further aspect of the invention, the total nominal design voltage across both batteries is approximately equal to the normal operating voltage of the disabled vehicle.

According to a further aspect of the invention, the total nominal design voltage across both batteries is no greater than approximately the maximum allowable operating voltage of the disabled vehicle.

In yet another aspect of the invention, means for electrically charging the auxiliary battery are provided, and second means for selectively connecting the charging means to the auxiliary battery are provided.

In a still further aspect of the invention, the second means may electrically connect the charging means to the auxiliary battery only when the auxiliary battery is not connected in electrical series with the primary battery.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and that several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE PREFERRED EMBODIMENT

Figure 1:
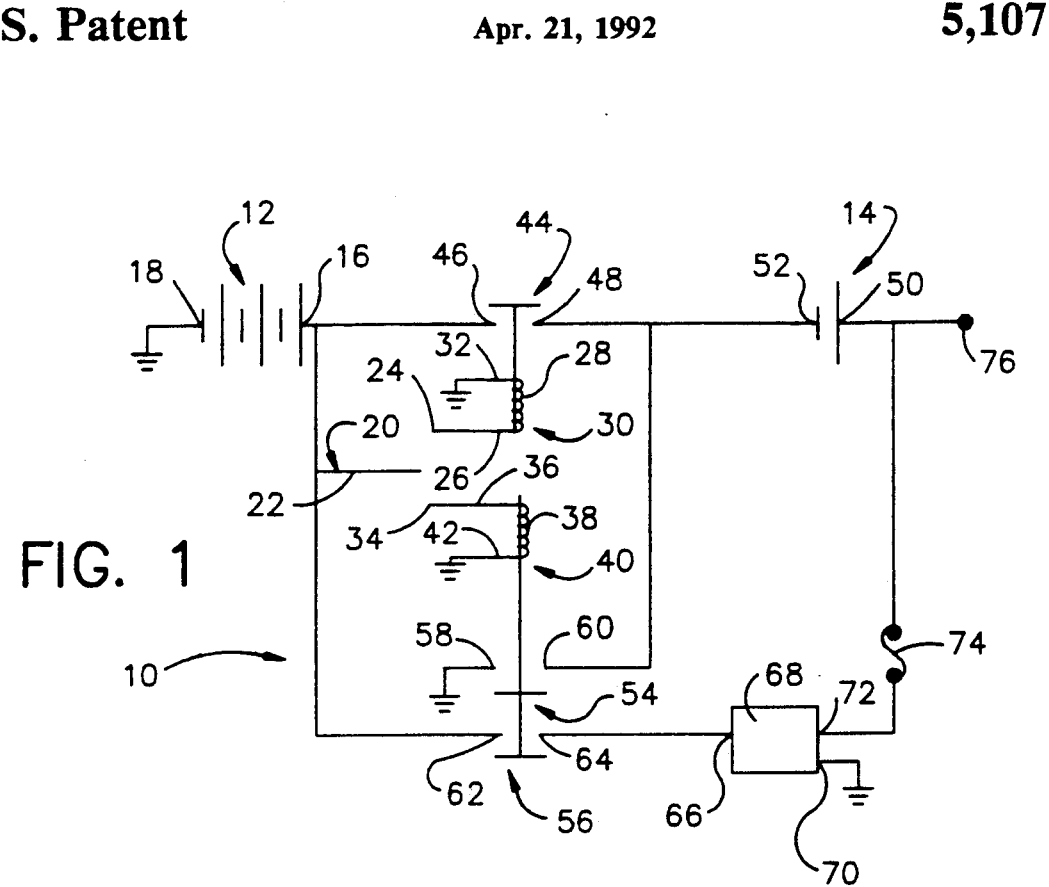
FIG. 1 is a schematic drawing which shows the circuitry of the 12 volt jump start system in accordance with the present invention.

Referring now to the drawings, FIG. 1 shows a schematic drawing of jump start system, generally designated by the numeral 10, in accordance with the present invention. As is well understood in the industry, when a disabled vehicle is being jump started, jumper cables are attached to the terminals of the battery of the disabled vehicle, and auxiliary power is provided therethrough. Once the vehicle has been started, the cables may be disconnected from the disabled vehicles battery. As used herein, the term disabled vehicle refers to any vehicle or engine which is in need of auxiliary power in order to be started, whether or not the vehicle or engine is actually "disabled".

Returning to FIG. 1, primary battery 12 may be electrically isolated from all systems, other than jump start system 10, such as a battery carried in a separate container or trunk of a vehicle. However, preferably primary C34E032 battery 12 is electrically connected to an electrical system (not shown) of the service vehicle used in combination with jump start system 10. When primary battery 12 is so connected to an electrical system of the service vehicle, it may also be referred to as the service vehicle battery. Such an arrangement provides for the recharging of auxiliary battery 14 of jump start system 10, as will be described later. Primary battery 12 has terminal 16 of a first polarity and terminal 18 of a second polarity. In the present case, terminal 16 is the positive terminal and terminal 18 is the negative terminal.

Single pole double throw switch 20 has pole 22 which is electrically connected to terminal 16. Throw 24 of switch 20 is electrically connected to first terminal 26 of electrical coil 28 of single pole single throw relay 30. Second terminal 32 of electric coil 28 is electrically connected to terminal 18 of primary battery 12. As shown herein, electrical connections to terminal 18 are accomplished by a common ground therebetween, although such connections may be physically connected directly to terminal 18. This is in accordance with typical vehicles which utilize a negative ground electrical system.

Throw 34 of switch 20 is electrically connected to first terminal 36 of electric coil 38 of double pole single throw electric relay 40. Second terminal 42 is electrically connected to terminal 18.

Relay 30 includes a pair of normally open electrical contacts, generally designated as 44. First electrical contact 46 is electrically connected to terminal 16. Second electrical contact 48 is electrically connected to terminal 52 of auxiliary battery 14. When electric coil of 28 is energized by electrically connecting pole 22 to throw 24 through switch 20, normally open contacts 46 are closed, forming a complete circuit and placing terminal 52 in electrical connection with terminal 16.

Auxiliary battery 14 includes terminal 50 which has the same polarity as terminal 16 of primary battery 12, and in this instance positive. Terminal 52 has the same polarity as terminal 18, in this instance negative. Thus, by operating switch 20 to place pole 22 in electrical contact with throw 24, auxiliary battery 14 is placed in electrical series connection with primary battery 12.

Jump start system 10 is in the start or jump configuration pole 22 is electrically connected to throw 24.

Electric relay 40 includes two pairs of normally open electrical contacts, generally designated as 54 and 56. First terminal 58 of electrical contacts 54 is electrically connected to terminal 18. Second terminal 60 is electrically connected to terminal 52 of auxiliary battery 14. First terminal 62 of electrical contacts 56 is electrically connected to terminal 16 of primary battery 12. Second terminal 64 is electrically connected to first electrical power connection 66 of voltage regulator 68.

Voltage regulator 68 also includes second electrical power connections 70 which is electrically connected to terminal 18. Voltage regulator 68 includes electrical charging terminals 72 which is electrically connected to terminal 50 of auxiliary battery 14.

Fuse 74 is provided between electrical charging terminals 72 and terminal 50 of auxiliary battery 14 to prevent damage to voltage regulator 68 in the event that jump start system 10 is placed in the charge mode while terminal 50 is connected to an operating vehicle. Fuse 74 may be replaced with a circuit breaker, or omitted altogether.

In the charging mode, voltage regulator 68 charges auxiliary battery 14. As will be described below, since it is anticipated that auxiliary battery 14 is of a lower voltage than primary battery 12, voltage regulator 68 not only regulates the voltage, but supplies the appropriate charging voltage to auxiliary battery 14. Voltage regulator 68 is designed so as not to overcharge auxiliary battery 14, as is well known in the art.

When jump start system 10 is to be used in combination with primary battery 12 in the jump mode to deliver auxiliary power to a disabled vehicle, pole 22 is electrically connected to throw 24 by switch 20, thus energizing relay 30 so as to close normally open electrical contacts 44. As previously mentioned, this places auxiliary battery 14 in electrical series with primary battery 12. The positive side of the electrical starting system of the disabled vehicle is electrically connected to terminal 50 of auxiliary battery 14 by any appropriate means, such as jumper cables. This connection may also be accomplished by providing terminal 76 which is physically separate from but electrically connected to terminal 50. The negative of the side of the disabled vehicle starting system is connected to terminal 18 of primary battery 12, also such as by jumper cables.

Jump start system 10 may then be used in combination with primary battery 12 to provide auxiliary power to the disabled vehicle in order to effect the starting thereof. Primary battery 12 does not have to be connected to an electrical system of the service vehicle during the jump starting of the disabled vehicle, but it may be without detrimental effects. Once a disabled vehicle has been started, jump start system 10 and primary battery 12 are disconnected from the electrical system of the disabled vehicle.

When not in the jump mode, jump start system 10 is preferably kept in the charge mode by electrically connecting pole 22 to throw 34 through switch 20. This energizes relay 40, thereby closing electrical contacts 54 and 56. The closure of electrical contacts 54 electrically connects terminal 52 of auxiliary battery 14 to terminal 18 of primary battery 12. The closure of contacts 56 electrically connects first electrical power connection 66 of voltage regulator 68 to terminal 16, thereby providing power to voltage regulator 68.

In this charging mode, power may be supplied by primary battery 12 to voltage regulator 68 to recharge auxiliary battery 14. However, primary battery 12 cannot provide sufficient charge by itself to auxiliary battery 14 to allow jump start system 10 to be repeatedly used. Thus, in the charge mode, it is anticipated and preferable that electrical power connections 66 will be connected to the charging system of the service vehicle or other similar power source, thereby not draining power from primary battery 12. This is easily accomplished using the electrical connections illustrated in FIG. 1 when primary battery 12 is connected to the charging system of the service vehicle, while the service vehicle engine is running. This arrangement also provides for the charging of primary battery 12. A sufficiently charged primary battery is necessary for the proper operation of jump start system 10.

A typical automotive engine of a disabled vehicle which could be started using jump start system 10, is anticipated to have an electrical system which incorporates a standard battery having a nominal design voltage of about 12 volts. In actuality, this voltage is about 12.5 volts. When the automotive engine is running properly, the alternator thereof will supply a voltage of about 14.8 volts, which may however range a little above 16 volts. Thus, the typical automotive electrical system is designed to have a normal operating voltage and can accommodate a maximum allowable operating voltage, and includes a vehicle battery which has a predetermined nominal design voltage.

Auxiliary battery 14 has a voltage which, when placed in series with primary battery 12 has a total design voltage therewith approximately equal to the normal operating voltage of the disabled vehicle being started. Although this total design voltage may be greater, it is preferable that it not exceed the maximum allowable operating voltage of the disabled vehicle. This overcomes the problems with the prior art as described above, wherein two identical batteries were used in series to jump start a disabled vehicle at twice the voltage of the disabled vehicle's battery. Such over biasing of a vehicle electrical system can cause permanent damage to sensitive computers, and mirco-chips, as well as burn out lights and blow fuses. Thus, it is equally important that the total design voltage across auxiliary battery 14 and primary battery 12, when connected electrically in series, be less than twice the nominal design voltage of the disabled vehicle's battery.

For use with a typical 12 volt automotive electrical system, jump start system 10 would be connected to a service vehicle with a 12 volt electrical system. The voltage of auxiliary battery 14 is 2 volts, yielding a total design voltage when placed in series with the service vehicle battery of approximately 14 volts. Auxiliary battery 14 could have a voltage of 4 volts, or could be comprised of two 2 volt batteries, yielding a total design voltage when in series with primary battery 12 of about 16 volts This voltage preferably should remain below the maximum operating voltage of the electrical system of the disabled vehicle.

It is important that auxiliary battery 14, as well as primary battery 12, have a sufficient cold cranking amp rating so as to provide the necessary auxiliary power. Typically, primary battery 12 will have a cold cranking amperage rating of 200 amps to 1200 amps. The cold cranking amperage rating of auxiliary battery 14 should be at least as high as that of primary battery 12. Otherwise, sufficient amperage may not be available to start a disabled vehicle.

Figure 2:
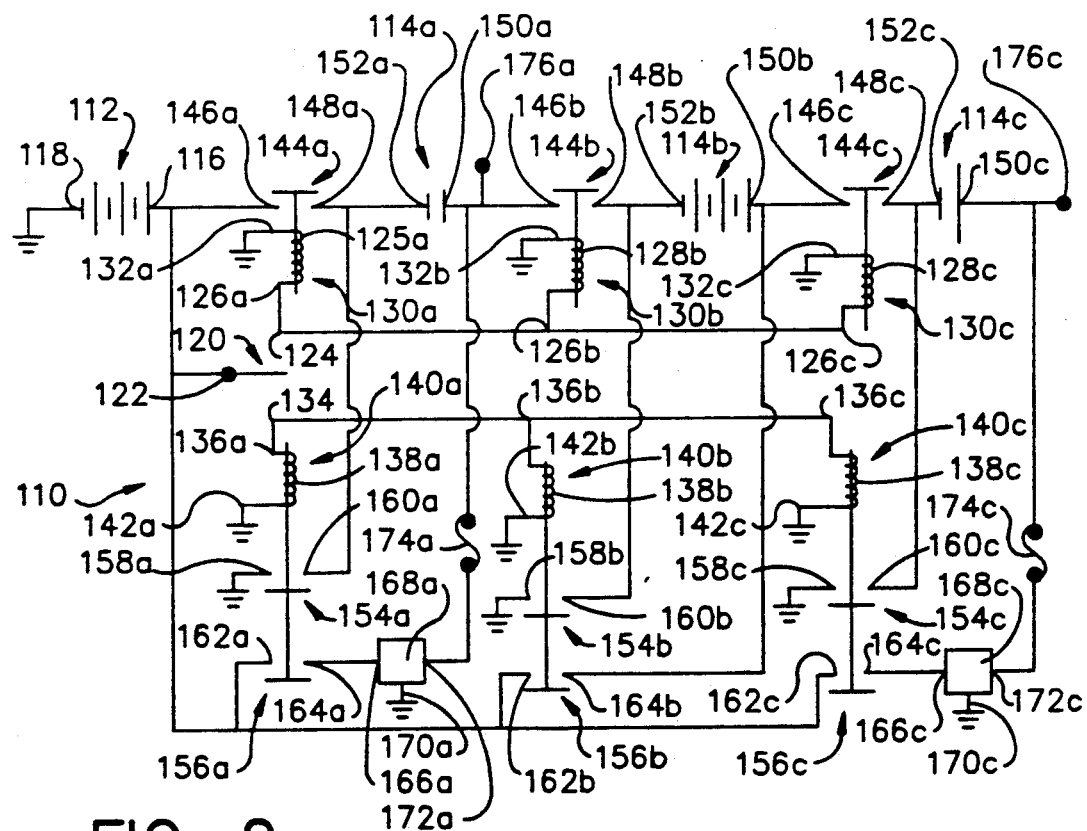
FIG. 2 is a schematic drawing which shows the circuitry of the 12 to 24 volt jump start system in accordance with the present invention.

Referring now to FIG. 2, wherein like numbers identify like elements of FIG. 1, a jump start system 110 is shown for use in providing auxiliary power to vehicles of different normal operating voltages, such as 12 volts electrical systems and 24 volts electrical systems. The electrical circuit of FIG. 2 is similar to that of FIG. 1, with the addition of second- and third auxiliary batteries 114 b, 114c. Each auxiliary battery 114a, 114b, 114c, has a respective first terminal 150a, 150b, 150c which correspond in polarity to terminal 116 of primary battery 112, and second terminals 152a, 152b, 152c which correspond in polarity to terminal 118.

Single pole double throw switch 120 has pole 122 which is electrically connected to terminal 116. Switch 120 has first throw 124 which is electrically connected to first terminals 126a, 126b, 126c, respectively of electric coils 128a, 128b, and 128c of first, second and third single pole single throw relays 130a, 130b, and 130c. Second terminals 132a, 132b, and 132c are electrically connected to terminal 118. Each single pole single throw relay 130a, 130b, 130c includes pairs of normally open electrical contacts 144a, 144b, 144c, respectively.

Throw 134 of switch 120 is electrically connected to first terminals 136a, 136b, 136c, respectively of electric coils 138a, 138b, 138c, of double pole single throw electrical relays 140a, 140b, 140c. Second terminals 142a, 142b, 142c are electrically connected to terminal 118. Each double pole single throw electrical relay 140a, 140b, 140c include two pairs of normally open electrical contacts 144a, 144b, 144c and 146a, 146b, 146c.

Contact 146a is electrically connected to terminal 116. Contact 148a is electrically connected to terminal 152a. Contact 146b is electrically connected to terminal 150a. Contact 148b is electrically connected to terminal 152b. Contact 156c is electrically connected to terminal 150b. Contact 148c is electrically connected to terminal 152c. When throw 124 is electrically connected to pole 122 through switch 120, single pole single relays 130a, 130b, 130c are energized, thereby closing electrical contacts 144a, 144b, 144c. The energization of these relays places auxiliary batteries 114a, 114b, 114c in series with each other and in series with primary battery 112.

Contact 160a is electrically connected to terminal 152a. Contact 160b is electrically connected to terminal 152b. Contact 160c is electrically connected to terminal 152c. Contacts 158a, 158b, 158c are each electrically connected to terminal 118. Contact 164a is electrically connected to first electrical power connection 166a of voltage regulator 168a. Contact 164b is electrically connected to terminal 150b. Contact 164c is electrically connected to first electrical power connector 166c of voltage regulator 168c. Contacts 162a, 162b, and 162c are electrically connected to terminal 116.

Voltage regulator 168a includes second electrical power connection 170a which is electrically connectable to terminal 118. Electrical charging terminal 172a is electrically connected to terminal 150a, with fuse 174a electrically interposed therebetween. Voltage regulator 168a is sized to provide the appropriate charging voltage to auxiliary battery 114a, as described above with respect to FIG. 1.

Voltage regulator 168c includes second electrical power connection 170c which is electrically connectable to terminal 118. Electrical charging terminal 172c is electrically connected to terminal 150c, with fuse 174c interposed therebetween. Voltage regulator 168c is also sized to provide the necessary charging based on the voltage of auxiliary battery 114c.

Terminal 176a is electrically connected to terminal 150a of auxiliary battery 114a, which provides electrical connection to be used when jumping the lower voltage, 12 volt disabled vehicles. Terminal 176c which is electrically connected to 150c is provided for jumping the higher voltage, 24 volt disabled vehicles.

The operation of the circuit shown in FIG. 2 is similar to that of the circuit shown in FIG. 1. Switch 120 is operable to connect pole 122 either to throw 124, the jump mode, or throw 134, the charging mode. In the jump mode, relays 130a, 130b, 130c are energized closing electrical contacts 144a, 144b, 144c, so as to place primary battery 112, and auxiliary batteries 114a, 114b, 114c in electrical series with each other.

In the charge mode, relays 140a, 140b, 140c are energized closing electrical contacts 154a, 154b, 154c and 156a, 156b, 156c. This provides power to voltage regulators 168a, 168c, which in turn provide an electrical charge to auxiliary batteries 114a, 114c, respectively. Auxiliary battery 114b may also be charged in this mode when the system is connected to an operating electrical charging system of the service vehicle.

This system is designed for use in jumping 12 volt or 24 volt disabled vehicles with a service vehicle having a 12 volt battery. Auxiliary batteries 114a and 114c are 2 volt batteries, while auxiliary battery 114b is a 12 volt battery. The voltage between terminal 176a and terminal 118, or ground, is approximately 14 volts, and may be used to jump a 12 volt disabled vehicle. Terminal 176c has a voltage of approximately 28 volts with respect to terminal 118, and may be used to provide auxiliary power to a 24 volt disabled vehicle. It should be noted that the voltages of auxiliary batteries 114a, 114b, 114c may be altered to achieve the same overall effect without deviating from the teachings of this invention.

The foregoing description of a preferred embodiment of the invention has been presented for purposes of illustration and description. It is not intended to be exhausted nor intended to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A jump starting system for providing auxiliary power in combination with a battery of a service vehicle to start the engine of a disabled vehicle the service vehicle battery having multiple cells and only two externally accessible electrical terminals, one of the terminals being of a first polarity and the other of the terminals being of a second polarity, the service vehicle including a service vehicle battery charging means for electrically charging the service vehicle battery, the service vehicle charging means including terminals of first and second polarity, the disabled vehicle having an electrical system which has a normal design operating voltage and a maximum design operating voltage, the disabled vehicle including a battery having a predetermined nominal design voltage and being connectable to the electrical system, said jump starting system comprising:
- (a) at least one auxiliary battery having an electrical terminal of a first polarity and having an electrical terminal of a second polarity, the first and second polarities of said auxiliary battery respectively corresponding to the first and second polarities of the service vehicle battery;
- (b) first means for selectively connecting said auxiliary battery in electrical series with the service vehicle battery, the total nominal design voltage across said auxiliary battery and the service vehicle battery while connected in electrical series being less than twice the nominal design voltage of the disabled vehicle battery;
- (c) second means for electrically charging said auxiliary battery independently of the service vehicle battery;
- (d) third means for selectively electrically connecting said auxiliary battery charging means to the service vehicle battery charging means so as to charge electrically said auxiliary battery.

2. The system as claimed in claim 1, wherein the total nominal design voltage across said auxiliary battery and said service vehicle battery while connected in electrical series is approximately equal to the normal operating voltage of the disabled vehicle electrical system.

3. A system as claimed in claim 1, wherein the total nominal design voltage across said auxiliary battery and the service vehicle battery while connected in electrical series is no greater than approximately the maximum allowable operating voltage of the disabled vehicle electrical system.

4. The system as claimed in claim 1, wherein said third means may electrically connect said auxiliary battery charging means to the service vehicle battery charging means only when said auxiliary battery is not connected in electrical series with the service vehicle battery.

5. The system as claimed in claim 4, wherein said first and third means are mutually exclusive in operation with respect to each other such that essentially either said auxiliary battery is connected in electrical series with the service vehicle battery or said auxiliary battery charging means is electrically connected to the service vehicle battery charging means.

6. The system as claimed in claim 5, wherein said auxiliary battery charging means includes at least a first and a second electrical power connection configured for connection to the service vehicle battery charging means, and at least one electrical charging connection adapted too provide a flow of current, said first electrical power connections being electrically connectable to said second polarity terminal of the service vehicle battery charging means, and at least one of said charging connections being electrically connected to said terminal of said first polarity of said auxiliary battery, and wherein said first and third means comprise:
- (a) a single pole, double throw electrical switch having a first throw and a second throw, said pole being electrically connectable to said first polarity terminal of the service vehicle battery charging means;
- (b) a single pole, single throw electrical relay having a pair of normally open contacts, one of said contacts being electrically connectable too said first polarity terminal of the service vehicle battery, the other contact being electrically connected to said second polarity terminal of said auxiliary battery, said electrical relay having ann electrical coil with at least two electrical terminals, one of said terminals being electrically connected to said first throw of said electrical switch, the other of said terminals being electrically connectable too said second polarity terminal of the service vehicle battery charging means;
- (c) a double pole, single throw electric relay having a first pair and a second pair of normally open electrical contacts, one of said contacts of said first pair being electrically connected to said second polarity terminal of said auxiliary battery, the other of said contacts of said first pair being electrically connectable to said second polarity terminal of the service vehicle battery charging means, one of said contacts of said second pair being electrically connectable to said first polarity terminal of the service vehicle battery charing means, the other of said contacts of said second pair being electrically connected to said second electrical power connections of said auxiliary battery charging means.

7. A jump starting system for providing auxiliary power to start the engine of a disabled vehicle in combination with a battery electrically connected to the ignition system of a service vehicle, said service vehicle battery having a terminal of a first polarity and a terminal of a second polarity, said jump start system comprising:
- (a) a first auxiliary battery having a terminal of a first polarity and a terminal of a second polarity;
- (b) a second auxiliary battery having a terminal of a first polarity and a terminal of a second polarity;
- (c) a third auxiliary battery having a terminal of a first polarity and a terminal of a second polarity;
- (d) the first polarity and the second polarity of each of said auxiliary batteries respectively corresponding too the first polarity and the second polarity of the service vehicle battery;
- (e) a single pole double throw electrical switch, said switch including a first throw and a second throw, said pole being electrically connectable to said first polarity terminal of the service vehicle battery;
- (f) first, second and third single pole single throw electrical relays, each of said electrical relays having a respective pair of normally open electrical contacts, each of said relays having a respective electrical coil, each of said electrical coils having first and second electrical terminals, each of said first electrical terminals being electrically connected to one throw of said switch, each of said second electrical terminals being electrically connectable to said second polarity terminal of the service vehicle battery;
- (g) first, second and third double pole single throw electrical relays, each of said electrical relays including a first and a second pair of normally open electrical contacts, each of said electrical relays including an electrical coil, each of said electrical coils having respective first and second terminals, each of said first terminals being electrically connected to said second throw of said electrical switch, each of said second terminals being electrically connectable to said second polarity terminal of the service vehicle battery;
- (h) said first contact of said first single pole single throw electrical relay being electrically connectable to said first polarity terminal of the service vehicle battery, said second contact being electrically connected too said second polarity terminal of said first auxiliary battery;

(i) said first electrical contact of said second single pole single throw electrical relay being electrically connected to said first polarity terminal of said first auxiliary battery, said second electrical contact being electrically connected to said second polarity terminal of said second auxiliary battery;

(j) said first electrical contact of said third single pole single throw electrical relay being connected to said first polarity terminal of said second auxiliary battery, said second electrical contact being electrically connected to said second polarity terminal of said third auxiliary battery;

(k) said first electrical contact of said first pair of contacts of said first double pole single throw electrical relay being electrically connected to said second polarity terminal of said first auxiliary battery, said second electrical contact being electrically connectable to said second polarity terminal of the service vehicle battery;

(l) said first electrical contact of said first pair of contacts of said second double pole single throw electrical relay being electrically connected to said second polarity terminal of said second auxiliary battery, said second electrical contact being electrically connectable to said second polarity terminal of the service vehicle battery;

(m) said first electrical contact of said first pair of contacts of said third double pole single throw electrical relay being electrically connected to sad second second polarity terminal of said third auxiliary battery, said second electrical contact being electrically connectable to said second polarity terminal of the service vehicle battery;

(n) first and second voltage regulators, having respective first and second electrical power terminals, each of said respective first electrical power terminals being electrically connectable to said second polarity terminal of the service vehicle battery, said first voltage regulator having a charging terminal electrically connected to said first polarity terminal of said first auxiliary battery, said second voltage regulator having a charging terminal electrically connected to said first polarity terminal of said third auxiliary battery;

(o) said first electrical contact of said second pair of electrical contacts of said first double pole single throw electrical relay being electrically connected to said second electrical power terminal of said first voltage regulator, said second electrical contact being electrically connectable to said first polarity terminal of the service vehicle battery;

(p) said first electrical contact of said second pair of electrical contacts of said second double pole single throw electrical relay being electrically connected to said first polarity terminal of said second auxiliary battery, said second electrical contact being electrically connectable to said first polarity terminal of the service vehicle battery; and (q) said first electrical contact of said second pair of electrical contacts of said third double pole single throw electrical relay being electrically connected to said second electrical power terminal of said second voltage regulator, said second electrical contact being electrically connectable to said first polarity terminal.

8. The system of claim 7, wherein said first and third auxiliary batteries have a nominal design voltage of two volts, and said second auxiliary battery has a nominal design voltage of 12 volts.

9. A jump starting system for providing auxiliary power in combination with a primary battery to start the engine of a disabled vehicle, the primary battery having multiple cells and only two externally accessible electrical terminals, one of the terminals being of a first polarity and the other of the terminals being of a second and opposite polarity, the disabled vehicle electrical system having a normal design operating voltage and a maximum design operating voltage, the disabled vehicle electrical system designed to include a battery electrically connected to the electrical system, the disabled vehicle battery having a predetermined nominal design voltage, said jump starting system comprising:

(a) at least one auxiliary battery having an electrical terminal of a first polarity and having an electrical terminal of a second polarity, the first and second polarities of said auxiliary battery respectively corresponding to the first and second polarities of the primary battery;

(b) first means for selectively connected said auxiliary battery in electrical series with the primary battery, the total nominal design voltage across said auxiliary battery and the primary battery while connected in electrical series being less than twice the nominal design voltage of the disabled vehicle battery;

(c) second means for electrically charging said auxiliary battery independently of the primary battery;

(d) third means for selectively electrically connecting said charging means to a source of electrical power so as to charge electrically said auxiliary battery, said first and third means being mutually exclusive in operation with respect to each other such that essentially either said auxiliary battery is connected in electrical series with the primary battery or said changing means may be electrically connected to a source of electrical power;

(e) said auxiliary battery charging means including at least a first and a second electrical power connection configured for connection to a source of electrical power, and an electrical charging connection configured for providing a flow of current, said first electrical power connection being electrically connectable to a first terminal of a source of electrical power and said first polarity electrical charging connection being electrically connected to said terminal of said auxiliary battery; and (f) wherein said first and second means comprise:

(i) a single pole double throw electrical switch having a first throw and a second throw, said pole being electrically connectable to said first polarity terminal of the primary battery;

(ii) a single pole single throw electrical relay having a pair of normally open contacts, one of said contacts being electrically connectable to said first polarity terminal of the primary battery, the other contact being electrically connected to said second polarity terminal of said auxiliary battery, said electrical relay having an electrical coil with at least two electrical terminals, one of said terminals being electrically connected to said first throw of said electrical switch, the other of said terminals being electrically connectable to said second polarity terminal of the primary battery;

(iii) a double pole, single throw electrical relay having a first pair and a second pair of normally open electrical contacts, one of said contacts of said first pair being electrically connected to said second polarity terminal of said auxiliary battery, the other of said contacts of said first pair being electrically connectable to said second polarity terminal of the primary battery, one of said contacts of said second pair being electrically connectable to a second terminal of a source of electrical power the other of said contacts of said second pair being electrically connected too said second electrical power connection of said charging means.

* * * * *